United States Patent [19]

Poné, Jr. et al.

[11] 4,017,179
[45] Apr. 12, 1977

[54] AUTOMATIC DENSITY CONTROL

[75] Inventors: John Poné, Jr.; Kenneth B. Schrupp; Patrick J. Gilligan; Ronald B. Harvey, all of Minneapolis; Gerald A. Jensen, Wayzata, all of Minn.

[73] Assignee: Pako Corporation, Minneapolis, Minn.

[22] Filed: Sept. 4, 1975

[21] Appl. No.: 610,188

[52] U.S. Cl. ................................. 355/68; 355/38; 356/222; 354/31
[51] Int. Cl.² .................. G03B 27/74; G03B 27/78
[58] Field of Search ................. 355/37, 38, 41, 67, 355/68, 70, 71; 356/220, 221, 222, 225; 250/237 R, 239; 354/31, 59, 155

[56] References Cited
UNITED STATES PATENTS

| | | | |
|---|---|---|---|
| 3,694,074 | 9/1972 | Huboi et al. | 355/38 |
| 3,768,903 | 10/1973 | Steinberger et al. | 355/38 |
| 3,790,275 | 2/1974 | Huboi et al. | 355/68 |
| 3,855,601 | 12/1974 | Uchiyama et al. | 354/31 |

Primary Examiner—Russell E. Adams, Jr.
Attorney, Agent, or Firm—John W. Adams

[57] ABSTRACT

An automatic density control device for photographic printers for sensing and correcting for a "subject failure" in a photographic negative, where the subject area of the negative is out of the optimum density ratio to the background area, which device includes a frustopyramidal radiation directing member having its enlarged end proximate to the negative and its small end remote therefrom and being positioned to receive the radiation from a source through the negative and having subject sensing means mounted at the central portion of the enlarged proximate end of said member to sense the radiation passing through the central subject area of the negative and also having background sensing means mounted at the diminished remote end to sense the radiation passing through the marginal portions of the negative and the marginal portions of the enlarged end of said member and including circuitry for comparing the signals produced by said subject sensing means and background sensing means and thus deriving a density signal which is used to control the exposure time during the printing process.

9 Claims, 9 Drawing Figures

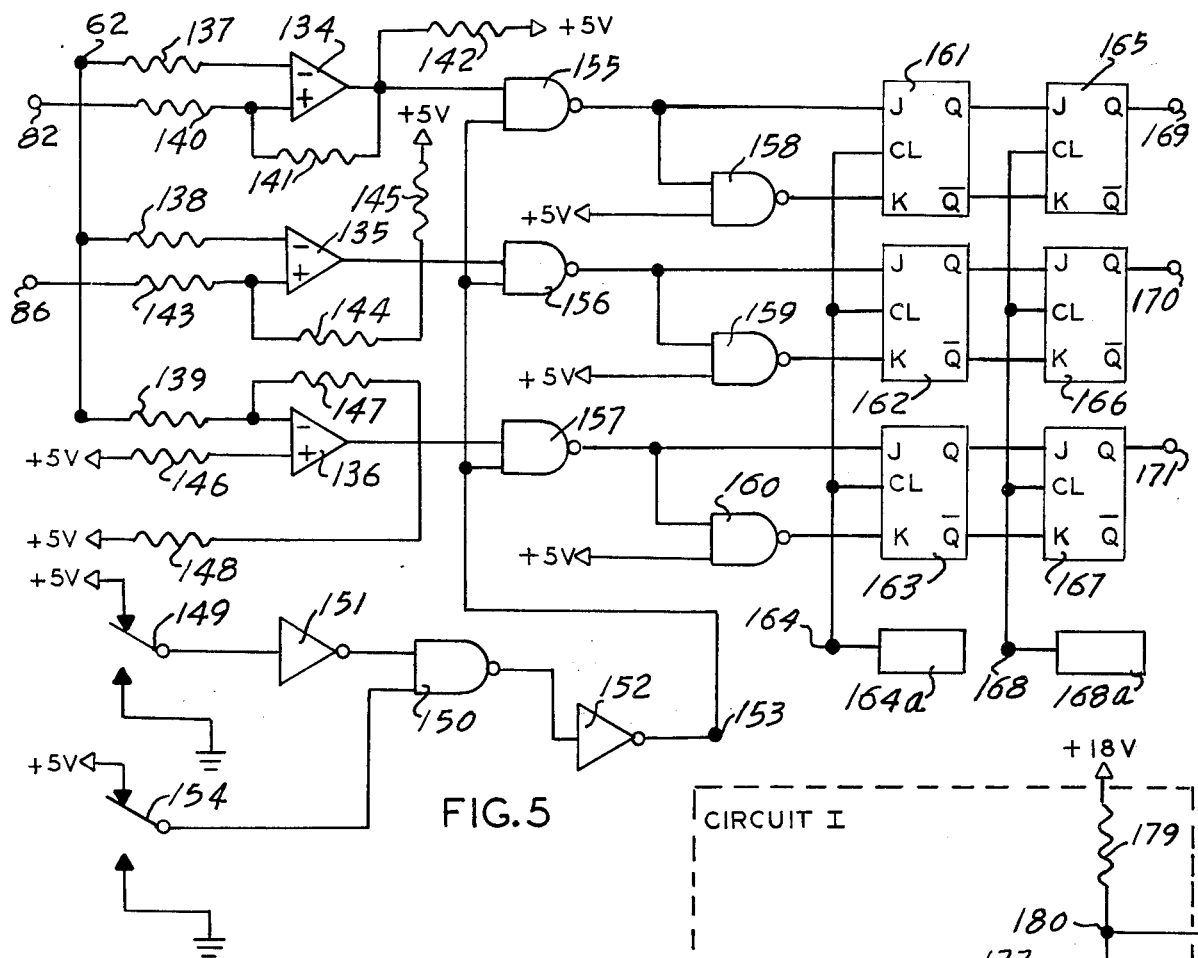
FIG.5
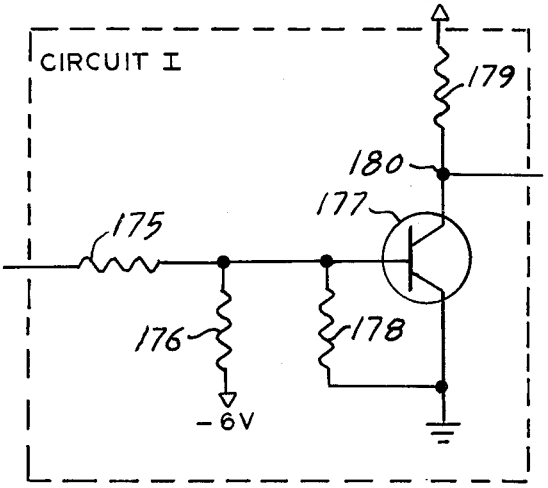
FIG.7
FIG.6
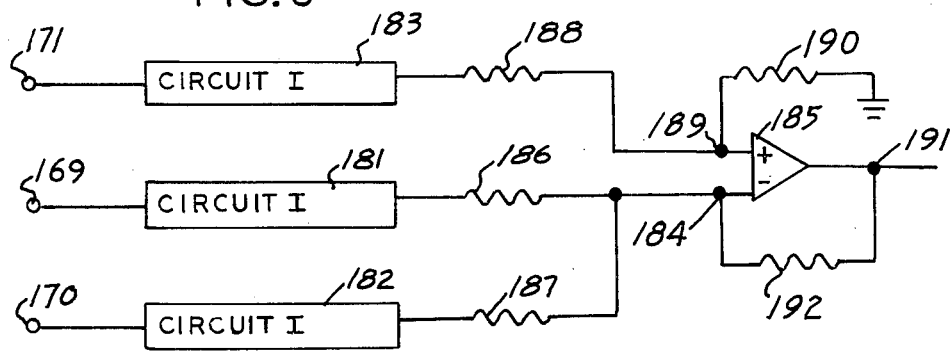

AUTOMATIC DENSITY CONTROL

In the photographic industry, automatic density control devices have been developed from time to time; however, these devices are for the most part highly complicated and in many instances are inadequate to perform the desired control functions to automatically correct for imperfect negative exposures which result in "subject failures," particularly in the case of small negatives.

In U.S. Pat. No. 3,790,275, entitled Method And Apparatus For Sensing Radiation Derived From Information Bearing Media, there is described color printing apparatus to direct radiation through a negative being sensed, radiation sensitive means provided for each primary color to sense the light densities in each of the primary colors of a center subject area divided into a plurality of discrete subportions each of which is separately sensed and a marginal outer area divided into two equal areas of said negative and to produce signals responsive to said sensed densities and means to combine said signals into a control signal which may be used to control the exposure time of said negative. This apparatus is complex and not easily adapted to existing printing machinery.

It is an object of the present invention to provide a simple and relatively inexpensive device which includes light directing member which permits the sensing and comparing the density of the subject and background areas of photographic negatives and for automatically compensating for imperfections in response to the ratio between the densities of said two areas during the printing operation by varying the duration of the printing time.

More specifically it is an object to provide a radiation transparent and directing frusto-conical or pyramidical member having subject sensing means at a top enlarged end thereof for sensing the intensity of the radiation transmitted by a radiation source which passes through the central subject portion of the negative to be printed and background sensing means mounted at the diminished end of said member to sense the intensity of the radiation transmitted by said radiation source which passes first through the outer marginal area of said negative and then through the outer marginal area of the enlarged end of said member with circuit means for comparing the signals produced by the subject and background sensing means and for controlling the exposure time of the negative in the printing operation.

These and other objects and advantages of this invention will be apparent from the following description made in connection with the accompanying drawings wherein like reference characters refer to similar parts throughout the several views, and in which:

FIG. 5 is a circuit diagram showing the comparison circuitry for receiving and comparing said adjusted ratio signal to said reference correction signals and producing correction output signals and means for storing the correction output signals resulting from said comparisons;

FIG. 6 is a circuit diagram showing the control circuitry for deriving a density control signal from the correction output signals produced in the circuitry shown in FIG. 5;

FIG. 7 is a circuit diagram showing the internal circuitry of one of the circuit components shown in FIG. 6.

Figure 1:
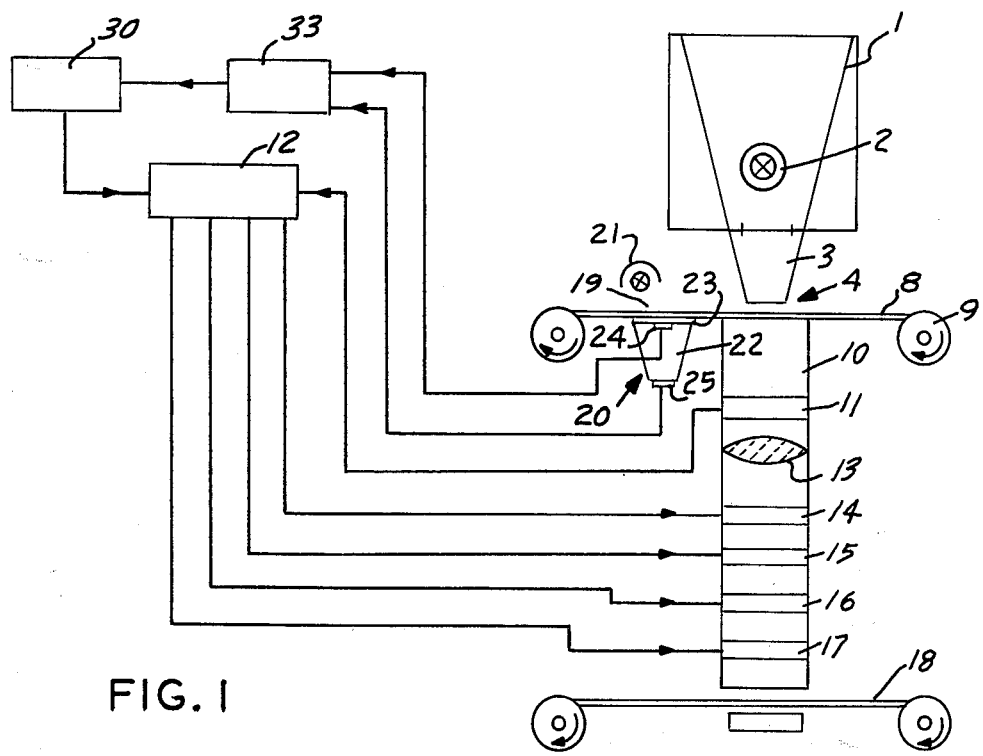
FIG. 1 is a diagrammatic view showing the general arrangement of the parts in a device embodying this invention for use in a photographic printer.

This invention relates to a device which automatically corrects the exposure time for printing imperfect negatives. Since it is difficult to understand the superior characteristics of this device without describing its operation in terms of the complete photographic printer print cycle, a brief description of a typical photographic printer and a typical print cycle with the instant invention is included herewith for clarity.

In a typical photographic printer a lamp housing 1 is provided to confine a suitable light source designated by the numeral 2 within said housing. A light directing cone 3 directs the light to a negative printing station 4 into which the individual negative frames 8 are fed from a roll of negatives 9. The light passes through the negative and into a light confining opaque tube 10 which embodies a generally circular ring of color sensors 11 having an open central portion. A suitable lens 13 is provided and a light cut-off shutter paddle 14 extends across the tube 10 below the lens 13. In the form shown, subtractive color filters 15, 16 and 17 are provided below the shutter paddle and these are respectively described in the optical industry as cyan, magenta and yellow filters which respectively filter out the red, green and blue primary colors. A roll of print paper 18 is provided below the light confining tube 10 and a suitable feeding mechanism (not shown) progressively positions the paper 18 at the print paper station for successively printing the negative 8 fed into the negative printing station 4 above.

The color sensors 11 deliver the individual color signals to conventional circuitry designated by block diagram 12 which is disclosed in the Pako Troubleshooting Manual for Mach I and Mach 1B printers being marketed by the assignee. This circuitry is known in the art as the large area transmission density (LATD) control circuitry. This circuitry by means of suitable solenoids respectively actuates the filters 15, 16 and 17 to subtract the red, green and blue light in accordance with the signals produced by the color sensors 11 and modification circuitry designated by block diagram 30. When the third filter paddle is inserted into the light path, the shutter paddle 14 is also projected into the light path to completely cut off the light through the tube 10. A suitable solenoid (not shown) is provided for actuating the shutter paddle 14.

The circuitry and control mechanism illustrated in said prior art Pako Troubleshooting Manual includes a number of manually controlled light timing buttons which are actuated by an operator after inspecting the negative at a preview station 19 in accordance with the observed density of the specific negative frame being inspected at said preview station. The present invention embodies a device and circuitry for automatically sensing the density of each negative frame at said preview station 19, comparing the signal produced by radiation passing through the center subject area of the negative frame with the signal produced by radiation passing through the outer marginal area of the negative and subsequently controlling the exposure time for the particular frame when the same has been fed into the exposure station 4.

An automatic density control assembly 20 is fixed in close spaced relation to a strip of photographic negatives 9 so that radiation from a preview radiation source 21 passes through a frame 8 of a roll of negatives 9 and into the enlarged proximate end of said assembly 20. While a large part of the radiant energy spectrum may be utilized, the instant invention in the form shown uses radiation in the visible light range. In the form shown in FIG. 2, the enlarged end of a generally frusto-pyramidal shaped member 22 which is constructed of optically transparent light-directing material such as lucite is separated from said frame 8 by a heat-absorbing optically transparent material 23. In the form shown, a subject sensing means comprising a light sensing element such as photocell 24 is embedded into the surface of said enlarged end of said member and background sensing means comprising a light sensing element such as a photocell 25, matched for light sensitivity with said photocell 24, is attached to the diminished end of said member 22.

Figure 2A:
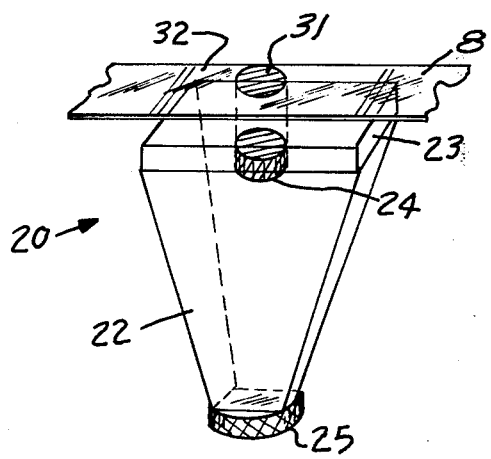
FIGs. 2a and 2b are side elevational views of two alternative designs of the Automatic Density Control Assembly with the subject and background sensing means respectively mounted in the top and bottom thereof.
Figure 2B:
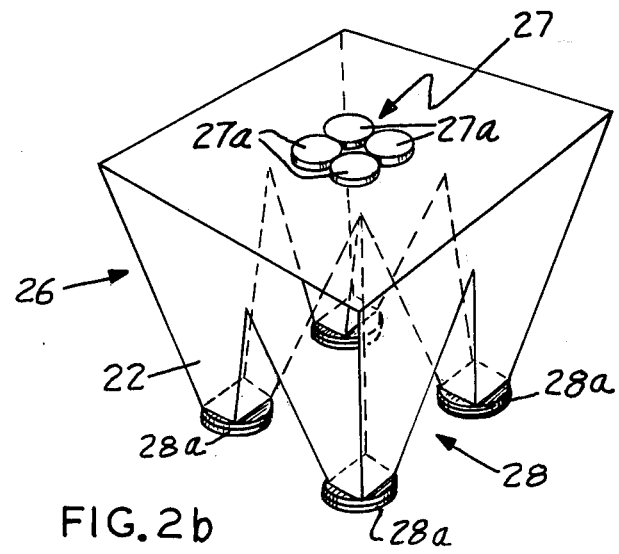

FIG. 2b shows a modified construction of said automatic circuitry control assembly for larger sized negatives. A plurality of cones 22a may be rigidly joined together in a parallel manner at the enlarged ends thereof, thus producing a larger light directing member 26. A subject sensing means 27 comprises, in the form shown, a plurality of light sensing elements such as photocells 27a mounted at the surface of the enlarged end of said member 26, while a background sensing means 28 comprises, in the form shown, a plurality of light sensing elements such as photocells 28a, one of each mounted at the surface of each smaller end of said cones 22a. Said photocells 27a produce signals in response to the light transmitted through a center subject area 31 of negative 8, while said photocells 28a produce signals in response to the light transmitted through the outer marginal area 32 of negative 8 which isn't sensed by photocells 27a. This eliminates the need for large-sized photocell in the subject sensing means 27, and the plurality of photocells in both means 27 and 28 allow more precise measurement of the light transmitted through the subject and background areas 31 and 32 of said negative 8.

Referring to FIG. 2a, light which is transmitted through the central subject area 31 of the negative frame 8 passes through the heat absorbing material 23 and is absorbed by said photocell 24. The light transmitted through the outer marginal area 32 of negative frame 8 is transmitted through the heat absorbing material 23 and member 22 and is absorbed by said photocell 25. Said photocells 24 and 25 produce electronic signals which are respectively transmitted to a ratio circuit 33.

Referring to FIG. 1 said ratio circuit 3 acts upon the signals from said means 24 and 25 to produce a first and second signal responsive to the signals produced by said means 24 and 25 and means for producing a ratio signal which has a direct relationship to the ratio of the first signal to the second signal. Said ratio signal is further acted upon by circuitry 30 to produce a plurality of correction output signals which are stored in said circuitry 30 in a plurality of devices known in the electronic art as flip flops until the negative frame 8 corresponding to said correction output signals is positioned by means (not shown) for printing at the negative printing station 4 and the printing cycle is initiated. Said plurality of correction output signals are acted upon by circuit 12 to produce a single density control signal. The red, green and blue color signals from said color sensor 11 are modified by conventional circuitry and then respectively integrated over time by means contained in circuit 12. Said density control signal is compared to the respective integrated color signals, and when the voltage level of an integrated color signal reaches the voltage level of said density control signal, conventional means (not shown) reinsert the color subtractive paddle corresponding to that color signal terminating exposure of the print paper 18 by that light as described above.

DESCRIPTION OF CIRCUITRY

Figure 3:
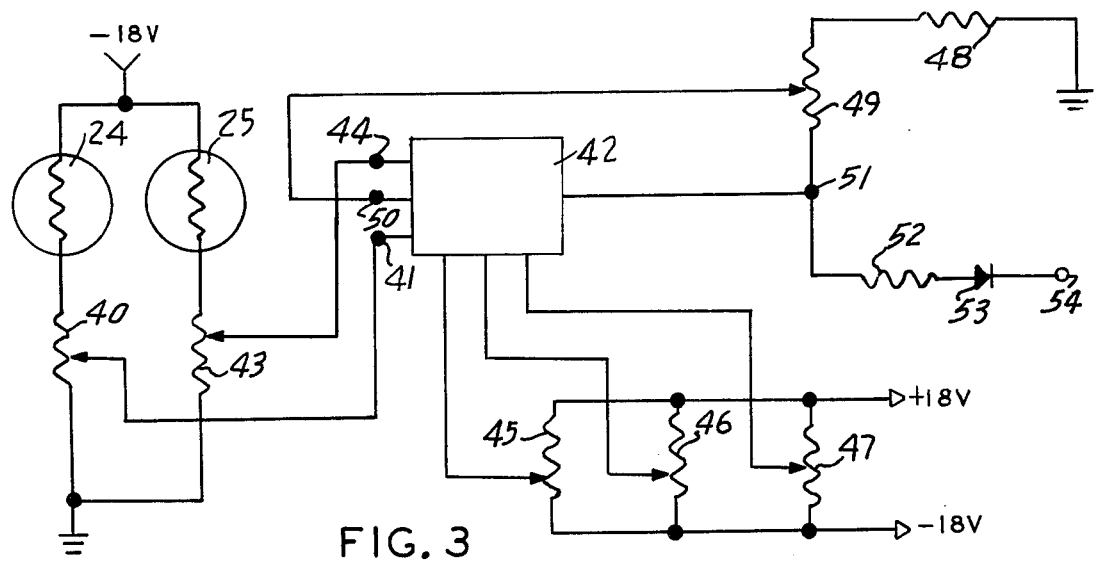
FIG. 3 is a circuit diagram showing the circuitry for comparing the subject sensing means and the background sensing means signals and deriving the ratio signal therefrom.

Referring to FIG. 3, one terminal of said photocell 24 is connected to a fixed source of 18 volts, and the other end of photocell 24 is connected to one end of variable resistor 40. The other end and the wiper arm of said variable resistor 40 is connected to ground and to input terminal 41 of divider circuit 42 respectively. Said photocell 25 has one terminal connected to a fixed voltage source of 18 volts and the other terminal connected to one end of variable resistor 43. The other end and the upper arm of variable resistor 43 is connected to ground and to an input terminal 44 of said divider circuit 42 respectively. Variable resistors 45, 46 and 47 have one end connected to a fixed voltage source of +18 volts, while the other ends of said variable resistors 45, 46 and 47 are connected to a fixed voltage source of −18 volts. The wiper arms of said variable resistors 45, 46 and 47 are connected to biasing inputs of said divide circuit 42. One end of resistor 48 is connected to ground and the other end is connected to an end of variable resistor 49 while the other end of said variable resistor 49 is connected to terminal 51. The wiper arm of said variable resistor 49 is connected to input terminal 50 of divider circuit 42. The output of divider circuit 50 is connected to terminal 51, which is connected by a resistor 52 and diode 53 to terminal 54.

Figure 4:
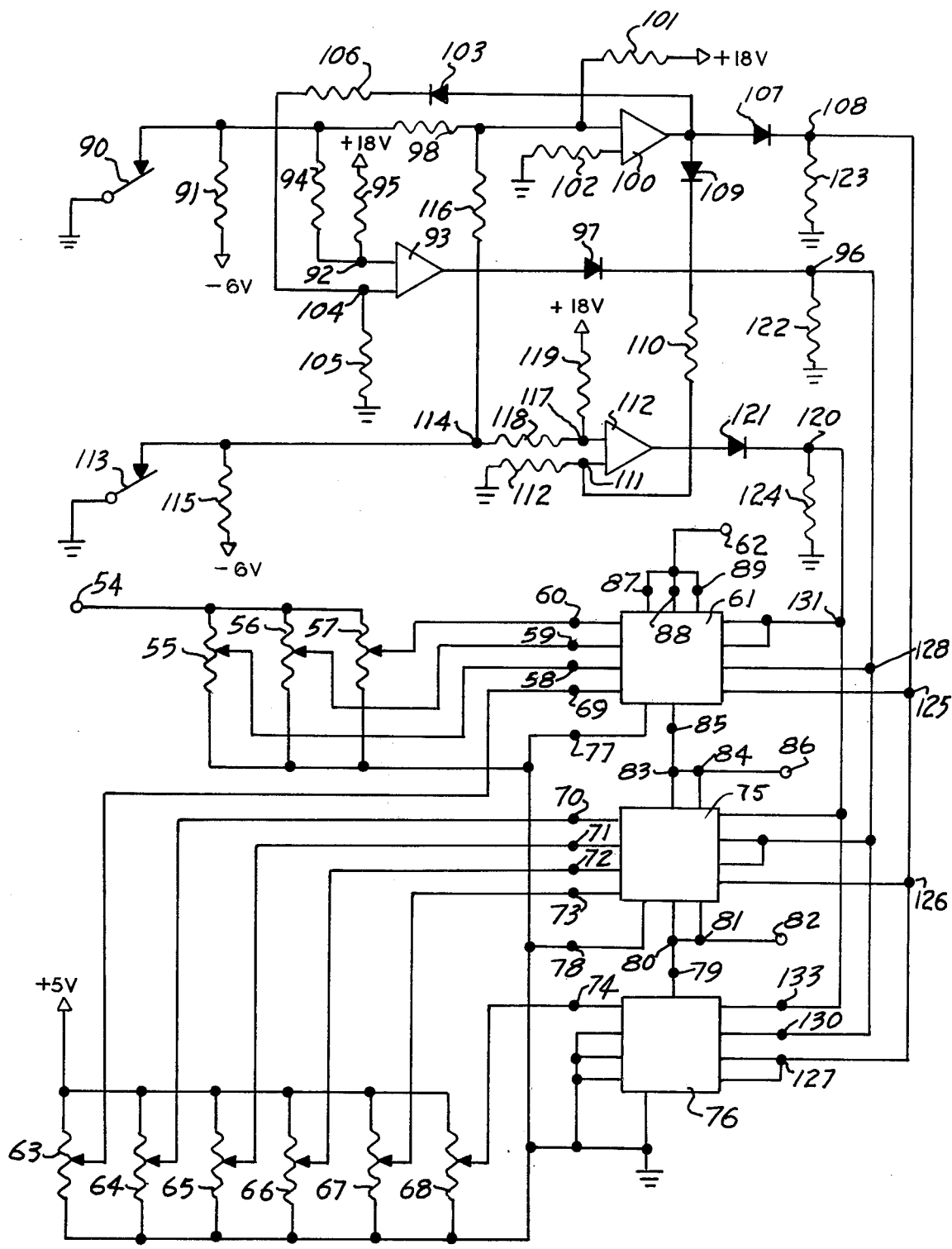
FIG. 4 is a circuit diagram showing the circuitry for adjusting the ratio signal and for deriving a plurality of reference correction signals for various film sizes.

Referring to FIG. 4, variable resistors 55, 56 and 57 have one end connected to terminal 54 and the other end connected to ground respectively. The wiper arms of said variable resistors 55, 56 and 57 are input terminals 58, 59 and 60 respectively of bilateral switch circuit 61. Variable resistors 63, 64, 65, 66, 67 and 68 have one end connected to a fixed voltage source of +5 volts and the other end connected to ground respectively. The wiper arms of said variable resistors 63, 64, 65, 66, 67 and 68 are connected to input terminal 68 of said bilateral switch circuit 61, to input terminals 70, 71, 72 and 73 of a bilateral switch circuit 75 and to input terminal 74 of a bilateral switch circuit 76 respectively. Terminals 77 and 78 of bilateral switch circuits 61 and 62 respectively are connected to ground, as are four terminals of bilateral switch circuit 76. Output terminal 79 of circuit 76 is connected to output terminals 80 and 81 of bilateral switch circuit 75 which are also connected to terminal 82. Output terminal 85 of bilateral switch circuit 61 is connected to output terminals 83 and 84 of bilateral switch circuit 75 which are also connected to terminal 86. The three output terminals 87, 88 and 89 of bilateral switch circuit 61 are connected to terminal 62.

Switch 90 is a typical single pole single throw switch with the movable contact connected to ground. The fixed pole of said switch 90 is connected to a fixed voltage source of −6 volts by resistor 91 and to input terminal 92 of operational amplifier 93 by resistor 94. Said input terminal 92 is also connected to a fixed voltage source of +18 volts by resistor 95. The output of said operational amplifier 93 is connected to terminal 96 by diode 97.

The fixed pole of switch 90 is also connected by resistor 98 to input terminal 99 of operational amplifier 100. Said input 99 is also connected to a fixed voltage source of +18 volts by resistor 101. The other input of said operational amplifier 100 is connected to ground by resistor 102. The output of said operational amplifier 100 is connected by a diode 103 and a resistor 106 to input terminal 104 of operational amplifier 93. Said input terminal 104 is also connected to ground by resistor 105. The output of operational amplifier 100 is connected by a diode 107 to terminal 108, and is also connected by a diode 109 and resistor 110 to an input terminal 111 of operational amplifier 112. Terminal 111 is connected also to ground by resistor 112.

Switch 113 is a typical single pole single throw switch with a movable contact connected to ground and fixed pole connected to terminal 114. Said fixed pole is also connected to a fixed voltage source of −6 volts by resistor 115. Terminal 114 is connected to terminal 99 by resistor 116. Input terminal 117 of operational amplifier 112 is connected to terminal 114 and to ground by resistors 118 and 119 respectively. The output of operational amplifier 112 is connected to terminal 120 by diode 121. Terminals 96, 108 and 120 are connected to ground by resistors 122, 123 and 124 respectively. Terminal 108 is also connected to enabling terminals 125 and 126 of bilateral switch circuits 61 and 75 respectively, and to enabling terminal 127 of bilateral switch circuit 76. Terminal 96 is connected to enabling terminals 128 and 129 and 130 of bilateral switch circuits 61, 75 and 76 respectively. Terminal 120 is connected to enabling terminals 131, 132 and 133 of bilateral switch circuits 61, 75 and 76 respectively.

Referring to FIG. 5, terminal 62 is connected to one input of comparator circuits 134, 135 and 136 of resistors 135, 138 and 139 respectively. Terminal 82 is connected to a second input terminal of comparator circuit 134 by resistor 140, said second input terminal is also connected to the output of said comparator circuit 134 by resistor 141. Said output of comparator circuit 134 is connected by resistor 142 to a fixed voltage source of +5 volts. A second input to comparator circuit 135 is connected to terminal 86 and to the output of said circuit 135 by resistors 143 and 144 respectively. The output of said circuit 135 is also connected to a fixed voltage source of +5 volts by resistor 145. A second input to comparator circuit 136 is connected to a fixed voltage source of +5 volts by resistor 146, while the input of said circuit 136 is connected to the output of said circuit 136 by resistor 147. The output of said circuit 136 is also connected to a fixed voltage source of +5 volts by resistor 148.

One pole of switch 149 is connected to ground and the other pole is connected to a fixed voltage source of +5 volts. The movable contact of said switch 149 is connected to one input of NAND circuit 150 by an inverter 151. The output of said NAND circuit 150 is connected to an inverter circuit 152, the output of said inverter circuit 152 connected to terminal 153. One pole of switch 154 is connected to ground and the other pole is connected to a fixed voltage source of +5 volts. The movable contact of said switch 154 is connected to the other input of NAND circuit 150.

Said terminal 153 is connected to one terminal each of NAND circuits 155, 156, 157, while the other terminal each of NAND circuits 155, 156 and 157 are connected to the outputs of comparator circuits 134, 135 and 136 respectively.

The outputs of NAND circuits 155, 156 and 157 are connected to one input each of NAND circuits 158, 159 and 160 respectively and are also connected to the input of JK flip flops 161, 162 163 commonly known in the art as the J input. The other input each of NAND circuits 158, 159 and 160 is connected to a fixed voltage source of +5 volts. The outputs of said NAND circuits 158, 159 and 160 are respectively connected to the input of JK flip flops 161, 162 and 163 commonly known in the art as the K input. The clock inputs of said JK flip flops 161, 162 and 163 are connected to terminal 164.

The output of JK flip flop 161 which is commonly known in the art as the Q output is connected to the J input of JK flip flop 165. The output of JK flip flop 161 commonly known in the art as the $\overline{Q}$ output is connected to the K input of JK flip flops 165. Similarly, the Q outputs of JK flip flops 162 and 163 are connected to J inputs of JK flip flops 166 and 167 respectively, and the $\overline{Q}$ outputs of JK flip flops 162 and 163 are connected to the K inputs of JK flip flops 166 and 167 respectively. The clock inputs of JK flip flops 165, 166 and 167 are connected to terminal 168. The Q outputs of JK flip flops 165, 166 and 167 are respectively connected to terminals 169, 170 and 171.

Referring to FIG. 7, a circuit I unit is shown to be comprised of an input resistor 175, a resistor 176 connecting the base of a transistor 177 to a fixed voltage source of −6 volts, a resistor 178 connecting the base of transistor 177 to the emitter of the same resistor 177, and a resistor 179 connecting the collector of transistor 177 to a fixed voltage source of +18 volts, and an output terminal 180 connected to the collector of transistor 177. Referring to FIG. 6, the inputs of three identical circuit I units, 181, 182 and 183 are connected to terminals 169, 170 and 171 respectively. The outputs of circuit I units 181 and 182 are connected to input 184 of comparator circuit 185 by resistors 186 and 187 respectively. The output of circuit I unit 183 is connected to input 189 of comparator circuit 185 by resistor 188. Said input 189 is connected to ground by resistor 190, which said input 184 is connected to the output 191 of comparator circuit 185 by resistor 192.

Referring to FIG. 3, in typical operation said photocells 24 and 25 are cadmium sulfide devices the resistance of which vary in inverse proportion to the amount of light contacting them. The greater the amount of light contacting said photocells 24 and 25, the less their resistance and the higher the voltage which is impressed across variable resistors 40 and 43 respectively. When light directing member 26 is used in place of member 22, the plurality of photocells 27a comprising subject sensing means 27 are connected in series and replace photocell 24, and the plurality of photocells 28a comprising background sensing means 28 are also connected in series and replace photocell 25. Otherwise, the circuitry and operation of the automatic density control remain the same. The range of voltage which may be so impressed is from approximately −18 volts of approximately 0 volts. Said circuit 42 is a circuit equivalent to Intersil type 8013 multiplier/divider circuit connected in the divider mode. The output voltage of said circuit 42 is in direct proportion to the ratio of the voltage of said first signal at terminal 41 to the voltage of said second signal at terminal 44. Variable resistors 45, 46 and 47 are used to correctly internally bias said divider circuit 42. The ratio signal measured at terminal 51 varies from approximately +0.1 volts to +10 volts, and a portion of said ratio signal voltage determined by the position of the wiper arm of variable resistor 49 is fed back into said divider circuit at terminal 50 to fix the overall gain of said circuit 42. The ratio signal also passes through resistor 52 and diode 53 to terminal 54. Variable resistors 40, 43 and 49 are so adjusted that when the optical densities of subject and background areas 31 and 32 are at optimum relation to each other the ratio signal measured at terminal 51 is +4 volts.

Referring to FIG. 4, this is a circuit which enables individual adjustment of the voltage of the ratio signal from terminal 54 and produces a +2 reference correction signal at terminal 86 and a +3 reference correction signal at terminal 82 for individual film sizes. As an example, for 110 film size, the film length switch 113 connects the input of operation amplifier 112 to ground (as shown). This results in a positive logic high level signal being produced at terminal 120. This in turn is connected to enabling input terminals 131, 132 and 133 of bilateral switch circuits 61, 75 and 76 which are equivalents to RCA type 4016. The result is to connect the wiper arm of variable resistor 57 by means of said circuit 61 to terminal 87, which is in turn connected to adjusted ratio output signal terminal 62, thus causing the voltage at terminal 62 to equal the voltage at terminal 60, and to connect the wiper arm of variable resistor 63 by means of said circuit 61 to terminal 85, which in turn connected to the +2 reference correction signal terminal 86, thus causing the voltage at terminal 86 to equal the voltage at terminal 58 and to connect the wiper arm of variable resistor 66 by means of circuit 75 to terminal 80 which is in turn connected to +3 reference correction signal terminal 82, thus causing the voltage at terminal 82 to equal the voltage at terminal 72. For 126 film size, switch 90 is used to ground the input of operational amplifier 93 while switch 113 is in an open position causing a positive logic high level signal at terminal 96. This in turn causes the wiper arm of variable resistor 56, by means of circuit 61, to be connected to adjusted ratio output signal terminal 62, the wiper arms of variable resistor 64 and 67 to be connected to +2 reference correction signal terminal 86 and +3 reference correction terminal 82 respectively, by means of bilateral switch circuit 75. When both switches 90 and 113 are in the grounded position, for 135 size film, a positive logic high level signal is created at terminal 108, enabling bilateral switch circuit 61 to connect the wiper arm of variable resistor 55 to adjusted ratio output signal terminal 62, bilateral switch circuit 75 to connect the wiper arm of variable resistor 65 to the +2 reference correction signal terminal 86, and bilateral switch circuit 76 to connect the wiper arm of variable resistor 68 to the +3 reference correction signal terminal 82.

Referring to FIG. 5, the adjusted output ratio signal at terminal 62 is connected to the terminals which are called in the art "negative inputs" of comparator circuits 134 and 135 by resistors 137 and 138 respectively, and to the terminal which is called in the art the "positive input" of comparator circuit 136 by resistor 139. Said circuits 134, 135 and 136 are equivalent to a National type LM 339 comparator circuit. The +3 reference correction signal at terminal 82 is connected to the positive input of comparator circuit 134 by resistor 140. A hysteresis resistor 141 connected from the input to the output of said comparator circuit 134 provides a degree of noise immunity in that the adjusted ratio output signal connected to the negative input of circuit 134 must be slightly higher (between +0.1 and +0.2 volts, the exact voltage being fixed by the value of resistor 141) than the +3 reference correction signal before said circuit 134 will operate (as opposed to said circuit operating when both signals are equal). Resistor 142 is necessary for the proper internal operation of said circuit 134. In typical operation, the +3 reference correction output signal of circuit 134 is high in positive logic terms (between +3.7 and +5.0 volts) unless the adjusted output ratio signal is about +0.1 to +0.2 volts greater than the +3 reference correction signal, at which time the +3 reference correction output signal of circuit 134 become low in positive logic terms (between 0.0 and +1.1 volts).

The operation of comparator circuit 135 is similar to that of circuit 134. The adjusted output ratio signal is connected to the respective input by resistor 138 and the +2 reference correction signal from terminal 86 is connected to the positive input of circuit 135 by resistor 143. A hysteresis resistor 144 performs the same noise immunity function on circuit 135 as resistor 141 does on circuit 134. Resistor 145 connects the output of circuit 135 to a fixed voltage supply of +5 volts, necessary for proper internal operation of circuit 135. Until the adjusted output ratio signal is between +0.1 and +0.2 volts higher than +2 reference correction signal, the output of circuit 135 is at a positive logic high level. When the adjusted output ratio signal becomes approximately +0.1 to +0.2 volts higher than the +2 reference correction signal (the actual level depending upon the resistance of resistor 144) the +2 reference correction output signal of circuit 135 changes to a positive logic law level.

The operation of comparator circuit 136 differs from that of circuits 134 and 138 in that the adjusted output ratio signal from terminal 62 is connected to the positive input by resistor 139 and the −2 reference correction signal (always fixed at +5 volts) is connected to the negative input by resistor 146 of comparator circuit 136. The hysteresis resistor 147 connected between the positive input and −2 reference correction output of circuit 136 gives equivalent noise protection as resistors 141 and 144 do to circuits 134 and 135. A resistor 148 connects the −2 reference correction output to a fixed voltage source of +5 volts, which is necessary for proper internal operation of circuit 136.

In typical operation, until the level of adjusted output ratio signal from terminal 62 comes within +0.1 to +0.2 volts (the exact voltage depends upon the resistance of resistor 147) of +5 volts, the −2 reference correction output signal of circuit 136 will be at a positive logic low level. When the said signal from terminal 62 comes within +0.1 to +0.2 volts of +5 volts, the −2 reference correction output signal will change to a positive logic high level.

The +3, +2 and −2 reference correction output signals are connected to one input of NAND circuits 155, 156 and 157 respectively. Said NAND circuits perform an enabling function in that the signal level at terminal 153, which is connected to the other input of said NAND circuits 155, 156 and 157, must be at a positive logic high level before said reference correction output signals may effectively act upon subsequent circuitry. Said signal at terminal 153 is a positive logic high level when the movable contact and the grounded pole of switch 149 are in contact and the movable contact and the pole connected to a fixed voltage source of +5 volts of switch 154 are in contact. Said movable contact of switch 149 in said grounded position imposes upon the input of inverter 151 a positive logic low level, with the result that the output of said inverter 151 is at a positive logic high level which is then impressed upon one input of NAND circuit 150. Said movable contact of switch 154 in said position to a fixed voltage source of +5 volts impresses upon the other input of said NAND circuit 150 a positive logic high level signal. The result of said impression of two positive logic high level signals upon the inputs of NAND circuit 150 results in a positive logic low level signal at the output of said NAND circuit 150, which is inverter 152 to a positive logic high level signal which is then fed to terminal 153.

The output of NAND circuit 155 is connected to the J input of JK flip flop 161 and to one input of a NAND circuit 158. The other input of NAND circuit 158 is connected to a fixed voltage source of +5 volts. The output of NAND circuit 158 is connected to the K input of said JK flip flop 161.

In typical operation, if the adjusted ratio output signal at terminal 62 is below the level of the +3 reference correction signal at terminal 82, the output signal of comparator 134 will be at a positive logic high level. Said high level output, coupled with the positive logic high level enable signal at terminal 153 will cause NAND circuit 155 to have a positive logic level output which is then impressed upon the J input of JK flip flop 161, and to one input of NAND circuit 158, which will result in a positive logic high level signal impressed upon the K input of said JK flip flop 161. When a clock 164a produces a signal which is applied to the clock input of JK flip flop 161, the outputs of said flip flop will then be at the following levels — the Q output will be at a positive logic low level, and the Q̄ output will be at a positive logic high level. These outputs are connected to inputs to JK flip flop 165 as shown in FIG. 5. When a clock 168a produces a clocking signal which is applied to the clock input of JK flip flop 165, it results in the Q and Q̄ outputs of flip flop 165 to assume the signal levels of the Q and Q̄ outputs of flip flop 161 respectively.

The Q output flip flop 165 is connected to terminal 169. The operation of flip flips 162 and 166, associated with the +2 and −2 reference correction signal work in a similar fashion. Whenever the adjusted ratio output signal is greater (by +0.1 to +0.2 volts) than the +3 reference correction signal (typically +2.5 volts), the +3 reference correction output signal at terminal 169 will be a positive logic high level. If the adjusted ratio output signal at terminal 162 is greater (by +0.1 to +0.2 volts) than the +2 reference correction signal (typically +3.5 volts), the +2 reference correction output signal at terminal 170 will be at a positive logic high level. If the said adjusted ratio output signal is above +4.8 to +4.9 volts, the −2 reference correction output signal at terminal 171 will be a positive logic low level.

Referring to FIG. 6, when the −2 reference correction output signal is at a positive logic low level (which corresponds to a modified ratio output signal of over +4.8 volts) which also means the +2 and +3 reference correction output signals are at a positive logic high level, the transistors in type I circuits 181 and 182 are saturated, thus tying terminal 184 to ground. The output signal of circuit 185 which is called the density control signal, in this situation, will be at +2 volts which is known as a "−2 condition" and occurs when an underexposed negative is sensed. When the +2 reference correction output signal is high and the +3 and −2 reference correction output signals are high (which corresponds to an adjusted ratio output signal of approximately +3.5 to +4.8 volts), the density control signal at terminal 191 will be approximately 0 volts, corresponding to a "normal" negative. When the +2 reference correction output signal is low and the +3 and −2 reference correction output signals are high (which corresponds approximately to an adjusted ratio output signal of +2.5 to +3.5 volts), the density control signal will be approximately −2.5 volts which is known as a "+2 condition" and occurs when a moderately overexposed negative is sensed. When both the +2 and +3 reference correction output signals are low (which corresponds approximately to an adjusted ratio output signal of 0 to +2.5 volts), the density control signal will be approximately −6.5 volts which is known as a "+5 condition" and occurs when a greatly overexposed negative is sensed.

Figure 8:
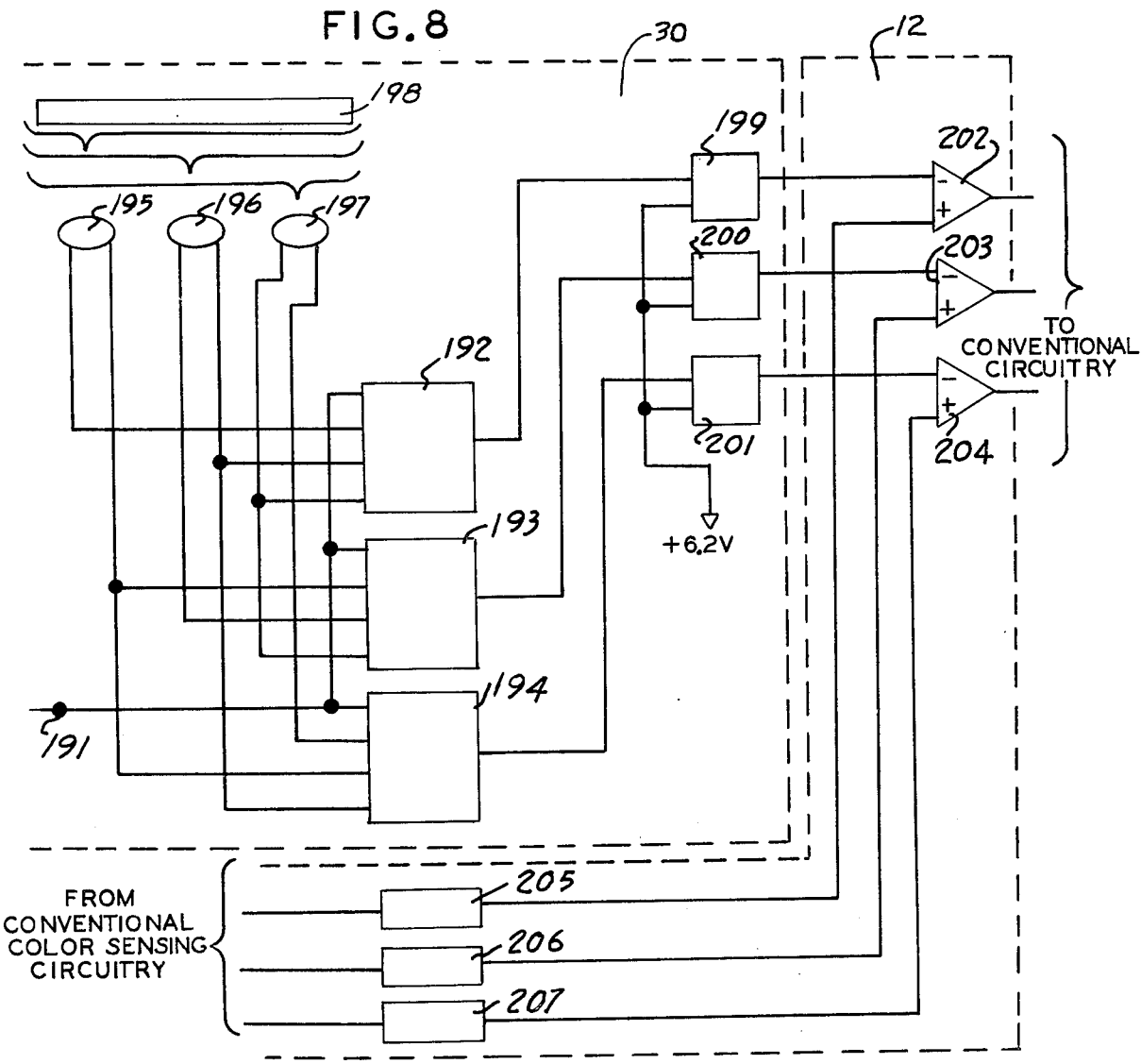
FIG. 8 is a block diagram showing portions of the control circuitry for controlling the exposure time of the negative.

Referring to FIG. 8, density control signal terminal 191 is connected to an input of red, green and blue color density control summing amplifiers 192, 193 and 194 respectively. Red, green and blue color switches 195, 196 and 197 have a first movable contact connected to an input of density control summing amplifier 192, 193 and 194 respectively. Red color switch 195 has a second movable contact connected to an input of green and blue density control summing amplifiers 193 and 194 respectively, and green color switch 196 has a second movable contact connected to an input of red and blue density control summing amplifiers 192 and 194 respectively, white blue color switch 197 has a second movable contact connected to an input of red and green density control summing amplifiers 192 and 193. The fixed contacts of said switches 195, 196 and 197 are connected to the outputs of resistor board 198. Said outputs of resistor board 198 provide a variety of manual biasing voltage between +5 volts and −5 volts to modify said density control signal manually. Said first movable contact of switches 195, 196 and 197 apply a manual biasing voltage to the respective red, green and blue color density control summing amplifiers 192, 193 and 194, while the second movable contact of said switches 195, 196 and 197 apply a voltage of approximately the same magnitude as that of the first movable contact of said switches but with opposite polarity, to inputs of summing amplifiers 193 and 194, 192 and 194, and 192 and 193 respectively. The outputs of said color density summing amplifiers 192, 193 and 194 are connected to a first input of summing amplifiers 199, 200 and 201 sum and then invert their respective inputs. Said amplifier 199, 200 and 201 outputs are then used as reference signals and are connected to a first input of red, green and blue comparators 202, 203, and 204 respectively, while second input of said comparators is connected to the output of red, green and blue integrators 205, 206 and 207 respectively. When the output of said red, green and blue integrators 205, 206 and 207 reaches a higher voltage level than said reference signals, the filter paddles 15, 16 and 17 corresponding to that red, green or blue color integrator 205, 206 or 207 is reinserted into the opaque tube 10 and terminates the exposure of the print paper 18 with that color of light. This termination process and apparatus is well known in the art and is disclosed in said Pako Troubleshooting Manual.

It can be seen that the instant invention embodies a preferred method of sensing subject failures of negatives over the prior art and is relatively simple and inexpensive.

It will, of course, be understood that various changes may be made in the form, details, arrangement and proportion of the parts without departing from the scope of the invention, which generally stated, consists in the matter set forth in the accompanying claims.

What is claimed is:

1. An improvement for use with a photographic printer of the type which includes, a negative strip feed and positioning mechanism, a print paper feed and positioning mechanism disposed in spaced relation to the negative strip feed and positioning mechanism, a printing station including a print radiation source positioned to direct radiation through said negatives and onto said print paper, a preview station located ahead of the printing station including negative positioning means and a preview radiation source positioned to direct radiation through a negative positioned at said preview station;

said improvement comprising:
a radiation directing member made from a material for conducting and directing radiation from one end to the other and being larger at one end than at the other with the enlarged end disposed in proximate spaced relation to said preview radiation source and the diminished end disposed remotely from said source, said member receiving and directing radiation transmitted through the negative positioned at the preview station,
subject sensing means mounted at the central portion of the enlarged end of said member to receive radiation transmitted through the central subject area of said negative from said preview radiation source,
background sensing means mounted at the diminished remote end of said member to receive radiation transmitted through the outer marginal area of said negative end directed through said member,
first electronic circuitry receiving the signals from said subject and background sensing means including means connected to said sensing means for producing a first and second signal responsive to the intensity of radiation respectively received by said subject and background sensing means and means for producing a ratio signal whose voltage is proportional to the ratio between the voltage of said first and second signals, and
second electronic circuitry receiving said ratio signal for producing a density output signal which may be used to control the exposure time of the negative in the photographic printer.

2. The improvement of claim 1 wherein said radiation directing member comprises,
at lease one generally frusto-pyramidal shaped cone constructed of a radiation transparent and directing material.

3. The improvement of claim 2 wherein said subject sensing means comprise,
at least one radiation sensitive element mounted at the surface of the central portion of the enlarged end of said member and leaving the outer marginal area exposed to radiation from said preview radiation source.

4. The improvement of claim 2 wherein said background sensing means comprise,
at least one radiation sensitive element mounted at the surface of the diminished end of said member, substantially covering the surface of said diminished end.

5. The improvement of claim 2 wherein said means connected to said sensing means comprises,
electronic means receiving the signals from the respective sensing means and producing a first and second signal proportionally related to the signals produced by the subject and background sensing means respectively, and
electronic means receiving said first and second signals for producing a ratio signal whose voltage is proportioned to the ratio of the voltages of said first and second signals.

6. The improvement of claim 1 wherein said second electronic circuitry comprises,
electronic means receiving said ratio signal to adjust the voltage level of said ratio signal and thereby produce an adjusted ratio output signal,
means to produce a plurality of reference correction signals,
comparison means receiving said adjusted ratio output signal and reference correction signals to compare said adjusted ratio output signal with each of said reference correction signals and to produce a plurality of correction output signals responsive to said comparisons,
electronic storage means to receive and store said correction output signals until said negative is correctly positioned at said printing station, and
means receiving said correction output signals to combine said correction output signals into a density control signal which may be used to control the exposure time of said negative in said photographic printer.

7. The apparatus in claim 1 wherein said radiation directing member comprises,
a plurality of generally frusto-pyramidal shaped cones constructed of a radiation transparent and directing material which are rigidly joined together in a parallel manner at the enlarged ends of said cones, thus forming the enlarged end of said member from the enlarged ends of said cones, and the diminished end of said member being comprised of the unjoined discrete diminished ends of said plurality of cones.

8. The apparatus in claim 6 wherein said subject sensing means comprises,
a plurality of radiation sensitive elements mounted at the surface of the central portion of the enlarged end of said member, and leaving the outer marginal area of the enlarged end of said member exposed to radiation said preview radiation source.

9. The apparatus in claim 8 wherein said background sensing means comprises,
a plurality of radiation sensitive elements at least one of each mounted on each of the diminished ends of said cones, substantially covering the surface area of the smaller ends of said cones.

* * * * *